M. G. McGUIRE.
COUPLING DEVICE.
APPLICATION FILED JULY 11, 1910. RENEWED APR. 10, 1911.
992,373.  Patented May 16, 1911.
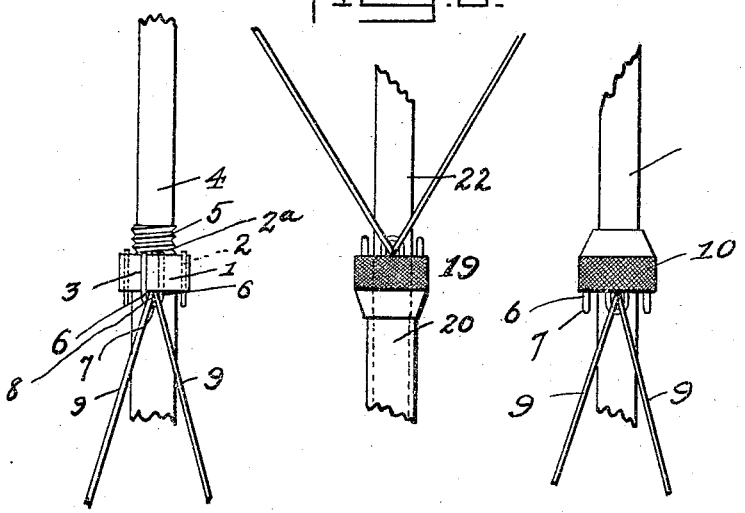
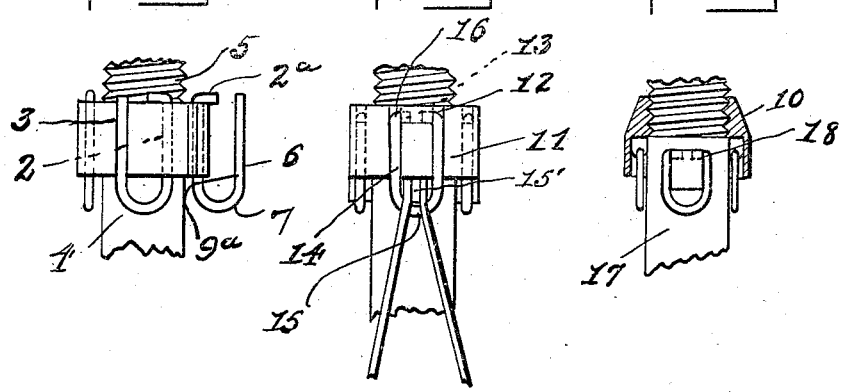

UNITED STATES PATENT OFFICE.

MICHAEL G. McGUIRE, OF NIAGARA FALLS, NEW YORK.

COUPLING DEVICE.

992,373.  Specification of Letters Patent.  Patented May 16, 1911.

Application filed July 11, 1910, Serial No. 571,334. Renewed April 10, 1911. Serial No. 620,096.

*To all whom it may concern:*

Be it known that I, MICHAEL G. McGUIRE, a citizen of the United States, and residing at Niagara Falls, in the county of Niagara and State of New York, have invented certain new and useful Improvements in Coupling Devices, of which the following is a specification.

This invention relates to a coupling device primarily designed for use in connecting the ribs of an umbrella to a stick in lieu of what is known as the ordinary notched collar and flexible connecting member used for such purposes, although it is to be understood that the coupling device can be utilized for connecting the stretchers of umbrellas to a runner, brace rods to a support, elements of derricks to a mast, stay braces and guy ropes to an upright, and for any purposes wherein the invention is found applicable.

Further objects of the invention are to provide a coupling device for the purpose set forth which is comparatively simple in its construction, capable of convenient application, strong, durable, reducing wear upon the connected ends of the elements to a minimum, readily set up in operative position, and comparatively inexpensive to manufacture.

With the foregoing and other objects in view, the invention consists of the novel construction, combination and arrangement of parts as hereinafter more specifically described and illustrated in the accompanying drawings, wherein are shown embodiments of the invention, but it is to be understood that changes, variations and modifications can be resorted to which come within the scope of the claims hereunto appended.

In the drawings wherein like reference characters denote corresponding parts throughout the several views: Figure 1 is an elevation of a coupling device in accordance with this invention with one of the elements removed and showing the adaptation thereof in connection with an umbrella stick and rib. Fig. 2 is an elevation of a coupling device in accordance with this invention showing the adaptation thereof in connection with an umbrella stick and ribs. Fig. 3 is a side elevation of a portion of the device. Fig. 4 is an elevation broken away of a modified form. Fig. 5 is an elevation broken away of a modified form, and Fig. 6 is an elevation showing the application of the invention to a runner and a plurality of stretchers of an umbrella.

A coupling device in accordance with this invention comprises a combined supporting and suspension means adapted to be attached to a suitable support, one or more attaching members, and a retaining member.

By way of example, a coupling device in accordance with this invention is illustrated in connection with the ribs and stretchers of an umbrella, yet it is to be understood that the use of the invention is not so limited.

Referring to Figs. 1, 2 and 3 of the drawings, the combined supporting and suspension means which will be referred to as a carrier is indicated by the reference character 1 and consists of a collar provided with a series of vertically-disposed openings 2 and a series of vertically-disposed peripheral grooves 3, each positioned in a plane extending between a pair of openings. The suspension means 1 is adapted to be secured to a suitable support, which by way of example, is shown as the stick of an umbrella 4 provided above the suspension means 1 with a series of threads 5.

Each of the attaching members is indicated by the reference character 6 and consists of a split loop having one leg extending through an opening 2 and bent to extend over the top of the carrier 1 as at $2^a$. The length of the member 6 is such that it will depend below the bottom of the suspension means 1. The lower portion of the attaching member 6 is curved as at 7 and which extends through the eyes 8 of a pair of ribs 9 whereby these latter are pivotally connected to the carrier. That leg of the member 6 which extends through the opening 2 is loosely connected to the carrier 1 whereby the other leg $9^a$ of the said member can be swung forward and away from the carrier 1 so that the leg $9^a$ can be when occasion so requires seated in a groove 3. The right-angularly disposed portion $2^a$ of said member 6 is spaced from the upper end of the leg $9^a$ whereby a passage is provided to allow of the mounting of the ribs 9 upon the attaching member. The rounded portion 7 of the attaching member reduces to a minimum wear upon the ends of the ribs which are mounted upon the member 6. As no sharp corners are provided at the lower ends of the attaching members, liability of breakage due to wedging between the ribs and members is reduced to a minimum as the rounded ends for the members prevent a wedging action as the ends of the ribs can freely move during the elevating and lowering of the ribs.

The retaining member is indicated by the reference character 10 and has an enlarged lower portion so as to extend over the carrier 1 when the retaining member is moved to operative position and when in such position, the member 10 will prevent the legs of the attaching member 6 from moving out of the grooves 3. The attaching member 10 at its upper portion is reduced and is provided with interior threads for engagement with the threads 5 of the stick 4 whereby the retaining member 10 is secured in position.

When the coupling device is used in connection with an umbrella, the attaching member can be extended so as to fully inclose the upper end of the stick and can be provided with a ferrule if desired or said members can engage the upper end of the stick and project therefrom and be provided with a ferrule.

If the coupling device is used in connection with a mast or other upright, the mast or upright is provided with threads for the engagement by the threads of the retaining member or said member can be secured to the mast or upright in any other suitable manner, as is obvious.

Referring to Fig. 4, the carrier which is indicated by the reference character 11 is provided with a plurality of pairs of peripheral grooves 12 and a counter-sunk portion in the top connecting the grooves of each pair together, said counter-sunk portion being indicated by the reference character 13 and constituting a seat. The form of attaching member as shown in Fig. 4 consists of a split loop 14 having a curved lower portion 15 and the ends thereof bent at right angles as at 16, said angular ends 16 being spaced from each other and mounted in the seat 13. When the attaching members are mounted in the grooves 12 and the angular ends 16 of the attaching members in the seat 13, the retaining member which is similar to that shown in Fig. 1 is then moved to a position to inclose the periphery of the carrier 11, whereby the attaching members are maintained in position. The curved lower portion 15 of the attaching member is adapted to support the braces or the other elements which are to be coupled in position. The carrier is provided with a plurality of depending lugs 15' for spacing the apertured connected ends of the elements carried by the attaching member, said elements being umbrella ribs, braces, stay bars, etc.

In the modification shown in Fig. 5, 17 denotes the stick of an umbrella which has struck therefrom a plurality of lugs. The lugs constitute the combined supporting and suspension means termed a carrier. Each pair of lugs is adapted to support and suspend an attaching member of a form similar to that shown in Fig. 4. The stick of the umbrella is provided with suitable threads for engagement therewith by the threads of the retaining member which is of the form shown in Fig. 1. The attaching members are positioned upon the suspension means 18 after the ribs have been mounted upon the attaching members and then the retaining member is moved to operative position to maintain the attaching members upon the stick 17.

In the construction shown in Fig. 6, the coupling device is referred to generally by the reference character 19 and is attached to the runner 20 of an umbrella. The position of the device is reversed to that shown in Fig. 1. The device 19 couples the stretchers 21 to the runner. The stick is indicated at 22.

By coupling or attaching umbrella ribs, stretchers or other elements in the manner as shown, the lower or upper face of the carrier constitutes a bearing for the ends of the ribs or elements during the shifting of these latter.

In connection with the employment of the device for coupling the ribs of an umbrella to a stick, it overcomes the objection of throwing of the ribs out of position or separation of the ribs from the stick. In this connection, it will be stated that ordinarily the ribs are coupled to the notched collar of an umbrella by a flexible member and that during the elevating and lowering of the rods, there is a constant pull and push on the flexible member which results in the unseating of the same, throwing the ribs out of position and oftentimes resulting in the breaking of the flexible member causing all of the ribs to become separated from the stick, but it is obvious that when the device is used in accordance with this invention, the throwing out of position of the ribs as well as the separation of the ribs from the stick is reduced to a minimum.

By employing a plurality of attaching members for one or more ribs or elements, it is obvious that if one attaching member breaks, but one or more ribs will be separated from the stick whereas if a single flexible member is used, if such member should break, all of the ribs would become separated.

What I claim is:

1. A coupling device comprising a combined supporting and suspension means, a plurality of attaching members in the form of shiftable split loops carried thereby for receiving and pivotally connecting elements to said means, and an adjustable retaining member partially surrounding the members and means whereby the attaching members are maintained in position against said means.

2. A coupling device comprising a combined supporting and suspension means, a plurality of attaching members in the form of shiftable split loops carried thereby for receiving and pivotally connecting elements to said means, and an adjustable annular retaining member partially surrounding said means and members whereby the attaching members are maintained in position against said means, each of said attaching members having a curved end portion.

3. A coupling device comprising a combined supporting and suspension means, a plurality of shiftable attaching members in the form of split loops carried thereby for receiving and pivotally connecting elements to the suspension means, and a retaining member partially surrounding the suspension means and said members whereby the attaching members are maintained in position against said means.

4. A coupling device comprising a combined supporting and suspension means, a plurality of shiftable attaching members in the form of split loops carried thereby for receiving and pivotally connecting elements to said means, and a retaining member partially surrounding said means and said members whereby the attaching members are maintained in position against said means, each of said attaching members having a curved end portion.

5. A coupling device comprising a combined supporting and suspension means, a plurality of attaching members in the form of split loops having a right-angularly disposed portion engaging said means whereby said attaching members are supported therefrom, each of said members having a curved end portion constituting means for pivotally connecting elements to the combined supporting and suspension means, and a retaining member partially surrounding said combined supporting and suspension means and said attaching members for maintaining the attaching members in position.

6. A coupling device comprising a combined supporting and suspension means, a plurality of shiftable attaching members in the form of split loops having a right-angularly disposed portion engaging said means whereby said attaching members are supported therefrom, each of said members having a curved end portion constituting means for pivotally connecting elements to the combined supporting and suspension means, and a retaining member extending around said combined supporting and suspension means for maintaining the attaching members in position.

7. A coupling device for the purpose set forth comprising a combined supporting and suspension means, an attaching member in the form of a split loop carried thereby and having a curved end portion for the reception of the end of an element whereby said element is connected to said means, and a retaining member extending over said means whereby the attaching member is maintained in position for connecting the element to said means.

In testimony whereof I affix my signature in presence of two witnesses.

MICHAEL G. McGUIRE.

Witnesses:
R. M. PARKER,
A. M. WILSON.